Dec. 17, 1968   J. B. MURPHY   3,416,427
PHOTOGRAPHIC APPARATUS
Filed Feb. 10, 1966   2 Sheets-Sheet 1

INVENTOR.
John B. Murphy
BY Brown and Mikulka
and
Charles S. McGuire
ATTORNEYS

Dec. 17, 1968   J. B. MURPHY   3,416,427
PHOTOGRAPHIC APPARATUS
Filed Feb. 10, 1966   2 Sheets-Sheet 2

INVENTOR.
John B. Murphy
BY Brown and Mikulka
and
Charles S. McGuire
ATTORNEYS 3,416,427
PHOTOGRAPHIC APPARATUS
John B. Murphy, West Roxbury, Mass., assignor to
Polaroid Corporation, Cambridge, Mass., a corporation of Delaware
Filed Feb. 10, 1966, Ser. No. 526,524
4 Claims. (Cl. 95—89)

ABSTRACT OF THE DISCLOSURE

A self-developing, film pack camera in which a processing liquid is distributed within a film unit by manually withdrawing the film unit from the camera between a pair of pressure rolls. A member is provided for engaging the film unit off center to assist in the proper distribution of the processing liquid despite improper withdrawal of the film unit by the operator.

---

This invention relates to photographic apparatus such as equipment for processing film units of the self-developing type and, more particularly, to apparatus for assisting in the proper distribution of a liquid processing agent between a pair of sheets of a film unit.

One type of so-called self-developing camera is designed to hold a plurality of film units arranged in superposed fashion within a pack or box. The pack is loaded into the camera back, and the individual film units are adapted to be successively exposed and then processed during withdrawal from the camera through a suitable opening therein. Each film unit includes a pair of sheets, at least one of which includes a photosensitive area which is exposed while the unit is held within the camera, and a rupturable container holding a liquid processing agent. Processing is accomplished by drawing the film unit between a pair of pressure-applying members, usually in the form of rotatable rolls, located within the camera adjacent the withdrawal opening, the rolls serving to rupture the container and distribute the liquid contents thereof between the superposed sheets of the film unit.

It is essential for the proper processing of the film unit that the developing agent be spread in a uniformly thin layer over the entire surface of the film unit to be processed. A number of improvements in apparatus for assisting in the proper distribution of the developer within the film unit have previously been proposed. Devices for this purpose include, for example, apparatus for preventing the developer from escaping from between the sheets, for guiding the sheets in the proper direction as they are drawn between the spread rolls, and for otherwise insuring the proper transport of the film units as the developer is being spread between the layers thereof.

Cameras of the general type adapted to employ individual film units initially contained within a pack adapted to be held in the camera back during exposure include those presently commercially available from Polaroid Corporation, Cambridge, Mass. and designated as Models 100, 101, 102, etc. Such cameras are shown and described together with film assemblages useful therein, for example, in U.S. Patents Nos. 3,161,122, 3,161,516, 3,165,039 and 3,165,040. Apparatus intended primarily for incorporation with cameras of this type and intended to perform one or more of the above-described functions are shown in Patent Nos. 3,327,599, 3,357,330, 3,264,963 and 3,270,643, and others. The present invention is also designed for incorporation in a camera of the above-mentioned type and is intended to insure proper developer distribution in spite of certain operator errors in withdrawing the film unit from the camera. The invention includes a structural member positioned to exert a pressure on an outer portion of the film unit as the latter is being withdrawn from the camera and the developer is being spread between the sheets; this element is so constructed and arranged that the developer within the film unit is forced away from the side where excess developer tends to flow and toward the side which may receive insufficient developer when the film unit is improperly withdrawn from the camera. More specifically, the problem to which the present invention is directed arises when the film unit is manually withdrawn from the camera between the spread rolls at an angle to the optimum direction of movement, which is perpendicular to the bite line of the rolls. Since the rupturable container of developer is designed and positioned within the film unit to release its contents for distribution along a front substantially parallel to the bite line, withdrawal of the film unit at an improper angle often results in improper or incomplete spreading of the developer over the area to be processed.

It is a principal object of the present invention to provide, in a self-developing camera, a novel combination of structural elements for cooperation with a film unit being withdrawn from the camera and processed to insure proper distribution of a liquid processing agent between a pair of liquid-confining layers of the film unit.

A further object is to provide photographic apparatus for assisting in the proper distribution of a liquid developer between a pair of sheets of a film unit as the latter is drawn between two pressure-applying spread rolls at an angle to a line perpendicular to the bite of the rolls.

Another object is to provide apparatus of the character described for improving developer distribution within a self-developing film unit and which may be easily incorporated in cameras of present commercial design.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
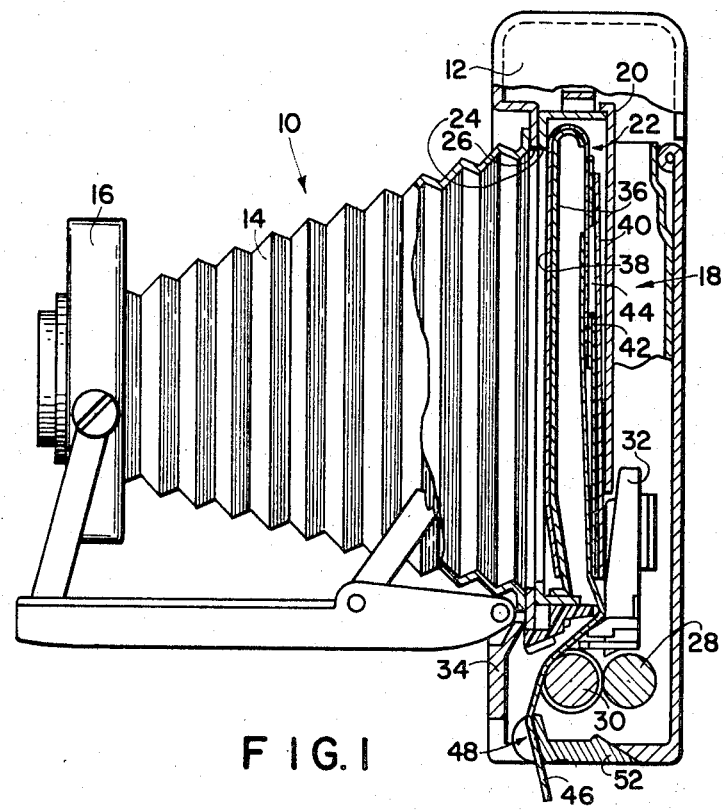
FIGURE 1 is an elevational view, partly in section, showing photographic apparatus in the form of a camera embodying the invention, the section being taken substantially midway between the sides of the camera.

Referring now to the drawings, in FIGURE 1 is shown a self-developing camera, indicated generally by reference numeral 10, and including camera body 12, bellows 14, lens and shutter housing 16 and the usual braces and supports for maintaining the various elements in operational relation to one another. Camera body 12 is adapted to receive film pack 18 which includes a magazine or container 20 and a plurality of film units 22, only one of which is shown in the drawing. Container 20 includes a frontal exposure aperture 24 which is aligned with a like aperture 26 in the camera body when film pack 18 is mounted therein. Camera 10 additionally includes processing apparatus including pressure rolls 28 and 30, edge-engaging and guide means 32 and tab guide bar 34.

Although the film pack and individual film units thereof constitute no part of the present invention, they will be described in some detail to make clear the operation and function of the processing apparatus. Pressure plate 36 is positioned within container 20 and holds photosensitive sheets 38 of film unit 22 flat in the focal plane of camera 10. Accordingly, photosensitive sheets 38 is located adjacent opening 24 of container 20 and exposure opening 26 of camera 10 with the photosensitive surfaces of the sheet at a correct position for photographic exposure. Other elements of the film assembly include a second, preferably image-receiving, sheet 40 positioned on the opposite side of pressure plate 36 from photosensitive sheet 38 and connected thereto by flexible strip 42 and leader 44. Tab 46 is initially attached to leader 44 and extends out of container 20, over tab strip bar 34 and out of the camera through exit aperture 48.

The leader sheets and photosensitive and image-receiving sheets are so constructed and coupled with one another as to position the photosensitive sheet in superposed, registered relation with the image-receiving sheet when leader 44 is drawn toward and through the withdrawal aperture of film pack container 20. Although only one film unit is shown within the film pack, the latter will normally contain a plurality of film units, e.g., eight, all similarly constructed and arranged with the photosensitive sheets disposed in stacked relation between the pressure plate and the forward wall of the film pack container. As initially supplied, the film pack includes a safety cover (not shown) completely covering the frontal aperture 24 of container 20, thus protecting the photosensitive sheets from actinic light prior to loading in camera 10, the safety cover having a leader which initially extends through exit aperture 48. After mounting the film pack within the camera, the safety cover may be removed by pulling on the leader. Tab 46 of the first film assembly is releasably attached to the safety cover and is pulled out, and finally separated from, the latter so as to extend through aperture 48 after the safety cover has been removed and discarded. Film unit 22 further includes container 49, described later in more detail, releasably holding a processing liquid, its release being effected by rupture of the container in a predetermined area upon compression between pressure rolls 28 and 30.

Figure 2:
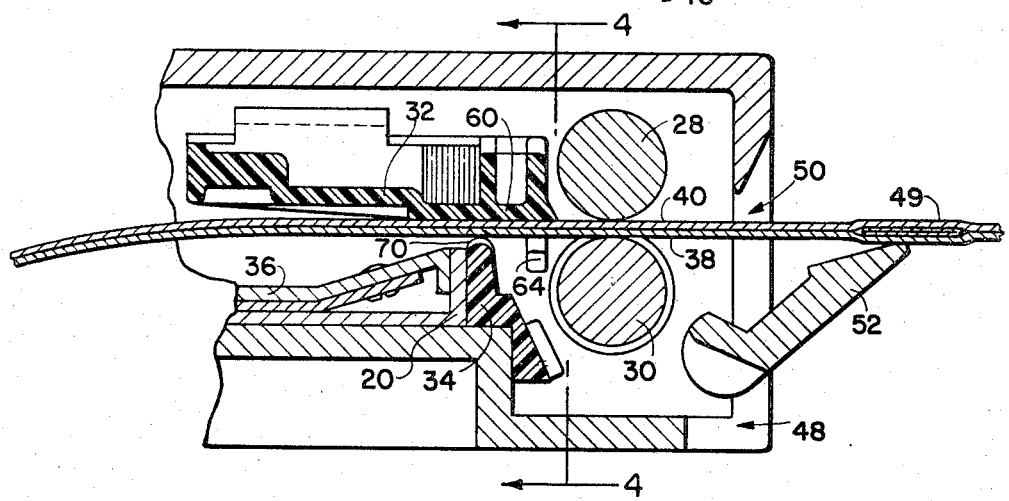
FIG. 2 is a fragmentary sectional view of a portion of the camera of FIGURE 1 illustrating the operation of the invention.

In operation, a latent image is formed in photosensitive sheet 38 through operation of the appropriate camera parts in the usual manner. Tab 46 is then pulled to advance leader 44 and photosensitive sheet 38. As shown in FIGURE 1, tab 46 is initially extended from its connection with leader 44 over tab strip bar 34 and out of the camera through exit aperture 48. When the tab has been advanced to the point where its connection with leader 44 passes over the edge of tab strip bar 34, continued advancement of the tab will cause it to separate from the leader. Since the attachment of the tab to the leader is a substantial distance from the leading edge of the leader, this edge has been advanced between pressure rolls 28 and 30 and out of the camera through exit aperture 50 (FIG. 2). The latter is provided by rotation of pivotally mounted closure element 52 through the pressure exerted thereon by tab 46. Unexposed film within camera body 12 is protected by appropriate, conventional means (not shown) from light entering through exit apertures 48 and 50. Thus, when tab 46 is broken away from leader 44, the leading edge of the latter element extends out of the camera to a position where it may be grasped by the operator to effect further advancement of film unit 22. Manual advancement of leader 44 will continue to advance photosensitive sheet 38 around pressure plate 36 until it is brought into superposition with sheet 40 at which time the connection between leader 44 and flexible strip 42 will cause sheet 40 to be advanced along with the rest of film unit 22. As sheets 38 and 40 are advanced between rolls 28 and 30, container 49 is compressed between the rolls and thereby caused to release its liquid content between the sheets.

Figure 5:
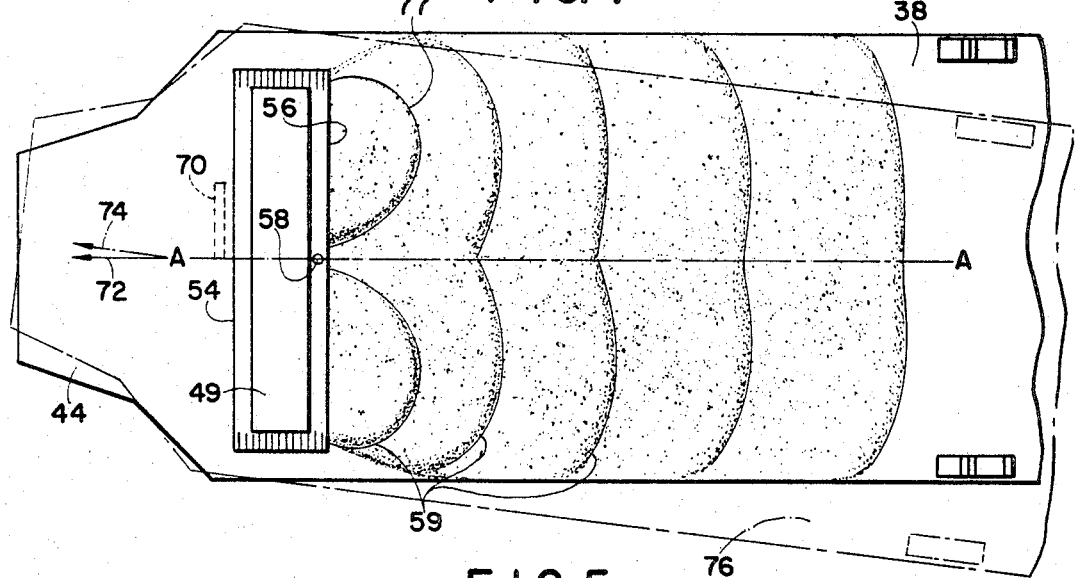
FIG. 5 is a somewhat exaggerated plan view illustrating the typical manner of distribution of developer within a film unit as the latter is drawn between the spread rolls of the camera.

As shown in FIG. 5, container 49 includes leading edge 54, which is the first portion of the container to be advanced between the pressure rolls, and trailing edge 56. The container is sealed around its peripheral edges, and the seal along trailing edge 56 is designed to be weaker than the seals along the other edges of the container, whereby the fluid pressure exerted within the container by the compressive force of the pressure rolls causes the container to rupture along trailing edge 56. The particular container shown in FIG. 5 further includes centrally disposed portion 58 of the rupturable edge of the container. Portion 58 is sealed with a stronger bond than the remainder of edge 56 and remains sealed, whereby the fluid is released on each side thereof in two fluid masses. These masses are reunited as the fluid is distributed between the sheets, as indicated by the progressive flow lines 59 in FIG. 5. Containers of this type form the subject matter of the invention set forth in U.S. Patent No. 3,221,942 wherein the structure and operation is more fully described. The present invention is preferably utilized to aid in proper distribution of developer which is released from containers of this type, but may also be employed with film units having containers from which the developer is released in a single fluid mass.

Figure 4:
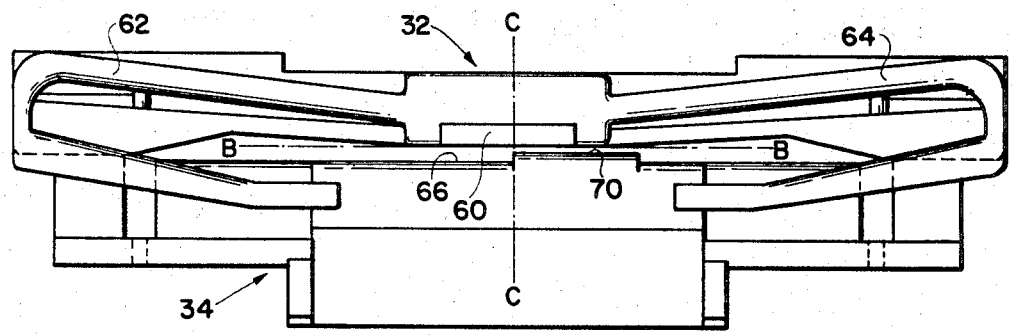
FIG. 4 is an elevational view of certain portions of the camera as seen from the section line 4—4 of FIG. 2.

As film unit 22 is drawn out of container 20 and between spread rolls 28 and 30, means are provided to assist in the proper transport of the film and spreading of the developer layer. Previously mentioned guide means 32 is secured within camera body 12 and includes centrally disposed portion 60, presenting a flat surface adjacent the plane of travel of the film unit between the rolls, and arms 62 and 64. Guide means 32 is constructed of a material such as a suitable plastic which provides a certain degree of flexibility of arms 62 and 64. As film unit 22 is advanced the side edges are engaged between the downwardly (as shown in FIG. 4) extending portions of the arms. Also, as best seen in FIGS. 1 and 2, arms 62 and 64 and the forward edge of portion 60 are positioned closely adjacent the bite of rolls 28 and 30 where the film unit enters. Thus, guide means 32 serves to position film unit 22 in the proper plane of advancement and in proper lateral registration with the rolls. Also, the engagement of the side edges of the film unit between arms 62 and 64 tends to prevent any developer from being forced out from between sheets 38 and 40 along the edges.

Figure 3:
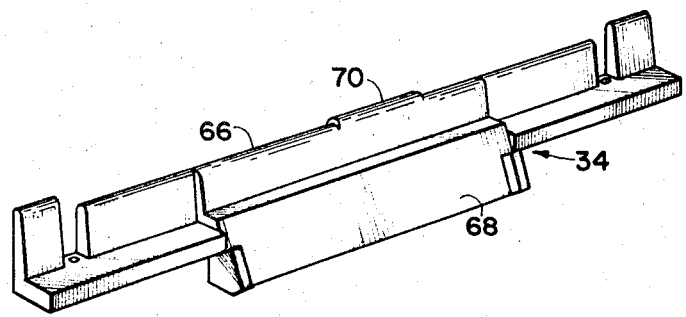
FIG. 3 is a perspective view of an element of the camera including one of the principal structural features of the invention.

Referring now to FIG. 3, tab strip bar 34 is shown in greater detail. As the name implies, an element of this type is provided in cameras utilizing film units employing separable tabs to effect an initial stage of advancement to guide the tabs in a desired direction so that they will be "stripped," or separated from the remainder of the unit, when their function has been accomplished. The tabs initially extend out of the exit opening of container 20 over edge 66 and surface 68 of tab strip bar 34. Rigid portion 70 of the bar presents an edge surface parallel with edge 66 and is associated with the tab strip bar in a particular orientation for performing a function explained in the following paragraphs.

Although guide means 32 serves to position the film unit in the proper plane and lateral registration as they are advanced between the pressure rolls, as previously explained, it is still possible that improper developer distribution may result due to operator error. FIG. 5 illustrates a typical film unit in two positions, indicated by solid and dot-dash lines. The line A—A is perpendicular to the axes or bite line of the pressure rolls between which the film unit is advanced by manually pulling on leader 44. Arrow 72 indicates the direction of advancement of the film unit shown in solid lines, i.e., along line A—A perpendicular to the bite line of the rolls, and arrow 74 the direction of advancement of the unit shown in dot-dash lines.

Container 49 is so designed that the fluid pressure created therewithin by compression between rolls 28 and 30 serves to rupture the seal along trailing edge 56 substantially along its entire length (except for portion 58) even though the container may be somewhat skewed with respect to the rolls. Therefore, the fluid is released from the container and spread between the sheets of the film unit along a front which is substantially symmetrical with respect to line A—A, i.e., parallel to the bite line of the rolls. This being the case, the fluid from container 49 would be released and spread along a front substantially such as that progressively shown by lines 59 in FIG. 5 whether the unit was advanced in the direction of arrow 72 or arrow 74. In the latter case, the film unit shown in dot-dash lines would receive insufficient developer in the area indicated by the reference numeral 76.

Portion 70 is provided on tab strip bar 34 in the present invention to obviate the problem described above. The line B—B in FIG. 4 shows the position of the bite line of rolls 28 and 30 with respect to elements 32 and 34, and line C—C indicates the lateral centerline of the rolls. It will be noted that the upper edge of portion 70 is parallel with line B—B, as is edge 66, and although portion 70 is spaced somewhat from this line, it is closer thereto than any other portion of strip bar 34. Hence, the outer surface of one of the sheets of the film unit will contact portion 70 as the unit is advanced between the rolls. It will also be noted that portion 70 lies entirely to one side of line C—C and is substantially less than half the width of the film unit.

In operation, portion 70 acts as a dam to divert the flow of some of the developer toward area 76 of the dot-dash film unit of FIG. 5 by exerting a greater force on the back surface of negative sheet 38 in the area above line A—A in FIG. 5 than the sheet receives in other areas. The lateral position of portion 70 with respect to the film unit is indicated in dotted lines, it being understood, of course, that portion 70 remains stationary as the film unit is advanced in the general direction of the arrows. Thus, the initial loop of developer released from container 49 on the side of the film unit adjacent portion 70 (i.e., the loop indicated in FIG. 5 by the reference numeral 77) tends to be flattened out as the developer is pushed to the other side.

The effect of portion 70 on developer distribution tends to be greater as the angle between line A—A and the direction of pull of the film unit becomes greater. This is due to the fact that the tendency to twist the film unit in its plane of advancement also tends to twist the unit somewhat with respect to this plane. For example, the film unit shown in solid lines in FIG. 5 is being advanced in the proper direction with no twisting force being exerted, whereby portion 70 has little or no effect on developer distribution, being spaced somewhat from the plane of advancement of the unit as explained in connection with FIG. 4. As the angle of advancement increases to the direction indicated by arrow 74, the twisting force applied to the film unit tends to push the back of negative sheet 38 against portion 70 with a proportionately greater force, thereby causing the developer to be directed toward area 76 in the proper degree to cover all portions of the superposed layers of the film unit.

In practice, it has been found that when utilized with film units having a picture area of approximately 3¼″ x 4¼″ (for example, those manufactured and sold by Polaroid Corporation and designated as Types 107 and 108) a satisfactory spacing of the upper surface or edge of portion 70 from the plane of advancement of the film unit (i.e., the distance from portion 70 to line B—B in FIG. 4) is about 1/16″. It has also been found that portion 70 need not extend a very great distance beyond edge 66 of tab strip bar 34 in order to serve its intended purpose in an effective manner, a height on the order of .020″ being satisfactory. It is preferred that portion 70 have one side substantially in alignment with the centerline of the rolls (line C—C) and extend therefrom a distance equal to about ¼ or less of the width of the film unit, entirely to one side of the centerline.

Since the camera is designed to be held in a particular orientation during film withdrawal, the tendency to twist the film during advancement is always in the same direction. That is, any deviation in the direction of advancement away from that indicated by arrow 72 would tend to be upward, toward the direction indicated by arrow 74, rather than downward, as the unit is pictured in FIG. 5. Hence, the positioning of portion 70 on the upper side of line A—A as shown in this figure always tends to cause the developer to flow in the desired direction. It may therefore be seen that the provision of a rigid member such as portion 70 within the camera back, in the particular orientation with respect to other camera elements and the position of the film unit during advancement between the spread rolls, effectively eliminates the problem of incomplete developer coverage due to advancement of the unit at an angle to the optimum direction of advancement.

Since certain changes may be made in the above apparatus without departing from the scope of the invention herein involved, it is intended that all matter contained in the above description or shown in the accompanying drawings shall be intrepreted as illustrative and not in a limiting sense.

What is claimed is:

1. In apparatus for processing a photographic film unit having a pair of sheets adapted to be arranged in superposed relation and a container releasably carrying a processing liquid for distribution between said sheets, means for effecting said distribution in a uniformly thin layer, said means comprising, in combination:
   (a) a pair of juxtaposed pressure-applying members having adjacent linear portions between which said film unit may be advanced with said sheets in superposed relation to effect release of said liquid from said container along a front substantially parallel to said linear portions irrespective of the angle of advancement of said film unit; and
   (b) a rigid member fixedly positioned with respect to said pressure-applying members and adjacent the path of advancement of said film unit for contact with a medial portion of the outer surface of one of said sheets in the area of said front of said liquid, said rigid member being positioned substantially entirely to one side of and at least close to a line extending through the lateral center of said pressure-applying members perpendicularly to said linear portions.

2. The invention according to claim 1 wherein said rigid member is affixed to an elongated element extending transversely across the path of advancement of said film unit, said rigid member likewise extending across a portion of said path and presenting a surface closer to the plane of advancement of said unit than any portion of said elongated element.

3. The invention according to claim 2 wherein the portion of said path across which said rigid member extends is substantially less than half the width of said film unit.

4. In apparatus for processing a photographic film unit having a pair of sheets adapted to be arranged in superposed relation and a container releasably carrying a processing liquid for distribution between said sheets, means for effecting said distribution in a uniformly thin layer, said means comprising, in combination:
   (a) a pair of juxtaposed pressure-applying rolls having adjacent linear portions between which said film unit may be advanced with said sheets in superposed relation to effect release of said liquid from said container along a front substantially parallel with said linear portions irrespective of the angle of advancement of said film unit;

(b) an elongated element extending transversely across the path of advancement of said film unit; and (c) a rigid member affixed to said elongated element in fixed position with respect to said pressure-applying rolls and extending across a portion of said path of advancement of said film unit which is substantially less than one-half the width of said film unit for contacting a portion of the outer surface of one of said sheets in the area of said front of said liquid, said rigid member being positioned substantially entirely to one side of a line extending through the lateral center of said pressure-applying rolls perpendicularly to said linear portions and presenting a surface spaced to one side of and lying closer to a plane through the bite line of said rolls and normal to a line through the axes thereof, than any other portion of said apparatus including said elongated element on said one side of said plane.

References Cited

UNITED STATES PATENTS 3,132,572  5/1964  Downey _____ 95—89 XR

NORTON ANSHER, *Primary Examiner.*

FRED L. BRAUN, *Assistant Examiner.*

U.S. Cl. X.R.

95—13